US011450490B2

(12) United States Patent
Molitor et al.

(10) Patent No.: US 11,450,490 B2
(45) Date of Patent: Sep. 20, 2022

(54) MECHANICAL INTERLOCK ASSEMBLIES FOR PANELBOARDS AND RELATED SYSTEMS AND METHODS

(71) Applicant: Eaton Intelligent Power Limited, Dublin (IE)

(72) Inventors: Andrew Molitor, Bloomington, IL (US); Matthew Jennings, Bloomington, IL (US); Matthew D. Occhipinti, East Peoria, IL (US)

(73) Assignee: Eaton Intelligent Power Limited, Dublin (IE)

( * ) Notice: Subject to any disclaimer, the term of this patent is extended or adjusted under 35 U.S.C. 154(b) by 384 days.

(21) Appl. No.: 16/804,915

(22) Filed: Feb. 28, 2020

(65) Prior Publication Data

US 2020/0286695 A1 Sep. 10, 2020

Related U.S. Application Data

(60) Provisional application No. 62/815,550, filed on Mar. 8, 2019.

(51) Int. Cl.
| | |
|---|---|
| *H01H 9/26* | (2006.01) |
| *H02B 1/04* | (2006.01) |
| *H01H 73/30* | (2006.01) |
| *H01H 73/44* | (2006.01) |
| *H02H 7/30* | (2006.01) |

(52) U.S. Cl.
CPC .............. *H01H 9/26* (2013.01); *H01H 73/30* (2013.01); *H01H 73/44* (2013.01); *H02B 1/04* (2013.01); *H02H 7/30* (2013.01)

(58) Field of Classification Search
CPC .. H01H 71/501; H01H 71/526; H01H 71/525; H01H 71/10; H01H 71/46; H01H 71/126; H01H 71/505; H01H 71/52; H01H 9/26; H01H 73/30; H01H 73/44; H01H 2300/018; H02B 1/40; H02B 1/04
See application file for complete search history.

(56) References Cited

U.S. PATENT DOCUMENTS

| | | | |
|---|---|---|---|
| 4,761,521 A | * 8/1988 | Beck ...................... | H02B 11/00 200/50.21 |
| 5,393,942 A | 2/1995 | Reiner et al. | |
| 5,436,415 A | 7/1995 | Smith et al. | |
| 5,486,978 A | 1/1996 | Fishovitz | |

(Continued)

OTHER PUBLICATIONS

Instruction Leaflet IL003003EN, "Mechanical interlock kit BRMIKBR installation instructions," Sep. 2013, 6 pages.

*Primary Examiner* — Bryan R Perez
(74) *Attorney, Agent, or Firm* — Myers Bigel, P.A.

(57) ABSTRACT

A panelboard system includes a panelboard, a first circuit breaker in the panelboard, a second circuit breaker in the panelboard, and an interlock assembly. The interlock assembly includes: an interlock panel, a first protrusion on the interlock panel and positioned above the first circuit breaker, a second protrusion on the interlock panel and positioned above the second circuit breaker, and a toggle bracket pivotally connected to the interlock panel at a pivot member between the first and second protrusions. The toggle bracket includes a first arm extending from the pivot member toward the first circuit breaker and a second arm extending from the pivot member toward the second circuit breaker.

18 Claims, 5 Drawing Sheets

(56) References Cited

U.S. PATENT DOCUMENTS

| | | |
|---|---|---|
| 5,902,974 A | 5/1999 | Fogle et al. |
| 6,043,439 A | 3/2000 | Crooks et al. |
| 6,388,214 B1 | 5/2002 | Jones et al. |
| 6,528,745 B1 | 3/2003 | Lathrop et al. |
| 6,743,987 B1 | 6/2004 | Remmert et al. |
| 6,825,426 B2 | 11/2004 | Muench et al. |
| 6,995,327 B1 | 2/2006 | Shepstone et al. |
| 7,145,089 B2 | 12/2006 | Bogdon et al. |

\* cited by examiner

MECHANICAL INTERLOCK ASSEMBLIES FOR PANELBOARDS AND RELATED SYSTEMS AND METHODS

RELATED APPLICATIONS

This application claims priority from U.S. Provisional Application No. 62/815,550, filed Mar. 8, 2019, the disclosure of which is incorporated by reference herein in its entirety.

BACKGROUND

Some panelboards incorporate a pair of circuit breakers for selectively switching the electrical supply to the panelboard between a primary source, such as the utility, and an alternate or secondary source, such as a generator. It is imperative in such applications that only one of these circuit breakers be in the closed (or "on") position at one time. This prevents backfeeding energy from the secondary source onto the primary source.

SUMMARY

Some embodiments of the present invention are directed to a panelboard system. The system includes: a panelboard; a first circuit breaker in the panelboard, with the first circuit breaker including a first handle that is movable between an on position and an off position; a second circuit breaker in the panelboard, with the second circuit breaker including a second handle that is movable between an on position and an off position; and an interlock assembly. The interlock assembly includes an interlock panel; a first protrusion on the interlock panel and positioned above the first circuit breaker; a second protrusion on the interlock panel and positioned above the second circuit breaker; and a toggle bracket pivotally connected to the interlock panel at a pivot member between the first and second protrusions. The toggle bracket includes a first arm extending from the pivot member toward the first circuit breaker and a second arm extending from the pivot member toward the second circuit breaker. When the toggle bracket is rotated in a first direction such that the first arm is adjacent and/or abutting the first protrusion and the first handle is then moved from the off position to the on position, the toggle bracket is held in a first position with the second arm positioned to prevent the second handle from moving from the off position to the on position. When the toggle bracket is rotated in a second direction, opposite the first direction, such that the second arm is adjacent and/or abutting the second protrusion and the second handle is then moved from the off position to the on position, the toggle bracket is held in a second position with the first arm positioned to prevent the first handle from moving from the off position to the on position Some other embodiments of the present invention are directed to an interlock assembly for use with a panelboard including a first circuit breaker having a first handle and a second circuit breaker having a second handle. The assembly includes: an interlock panel configured to be connected to the panelboard in an installed position; a first protrusion on the interlock panel; a second protrusion on the interlock panel; and a toggle bracket pivotally connected to the interlock panel at a pivot member between the first and second protrusions, with the toggle bracket including a first and second spaced apart arms each extending away from the pivot member. With the interlock panel in the installed position: when the toggle bracket is rotated in a first direction such that the first arm is adjacent and/or abutting the first protrusion and the first handle is then moved from an off position to an on position, the toggle bracket is held in a first position with the second arm positioned to prevent the second handle from moving from an off position to an on position; and when the toggle bracket is rotated in a second direction, opposite the first direction, such that the second arm is adjacent and/or abutting the second protrusion and the second handle is then moved from the off position to the on position, the toggle bracket is held in a second position with the first arm positioned to prevent the first handle from moving from the off position to the on position.

Some other embodiments of the present invention are directed to a method. The method includes providing a panelboard system including: a panelboard; a first circuit breaker in the panelboard, with the first circuit breaker including a first handle that is movable between an on position and an off position; a second circuit breaker in the panelboard, with the second circuit breaker including a second handle that is movable between an on position and an off position; and an interlock assembly. The interlock assembly includes: an interlock panel; a first protrusion on the interlock panel; a second protrusion on the interlock panel; and a toggle bracket pivotally connected to the interlock panel at a pivot member, with the toggle bracket including a first arm extending from the pivot member toward the first circuit breaker and a second, spaced apart arm extending from the pivot member toward the second circuit breaker. The method includes: with the first handle and the second handle each in the off position, rotating the toggle bracket in a first direction such that the first arm is adjacent and/or abutting the first protrusion; moving the first handle from the off position to the on position such that the first handle moves beneath the first arm of the toggle bracket; and in response to moving the first handle from the off position to the on position, holding the toggle bracket in a first position with the second arm positioned to prevent the second handle from moving from the off position to the on position. The method includes: with the first handle and the second handle each in the off position, rotating the toggle bracket in a second direction, opposite the first direction, such that the second arm is adjacent and/or abutting the second protrusion; moving the second handle from the off position to the on position such that the second handle moves beneath the second arm of the toggle bracket; and in response to moving the second handle from the off position to the on position, holding the toggle bracket in a second position with the first arm positioned to prevent the first handle from moving from the off position to the on position.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
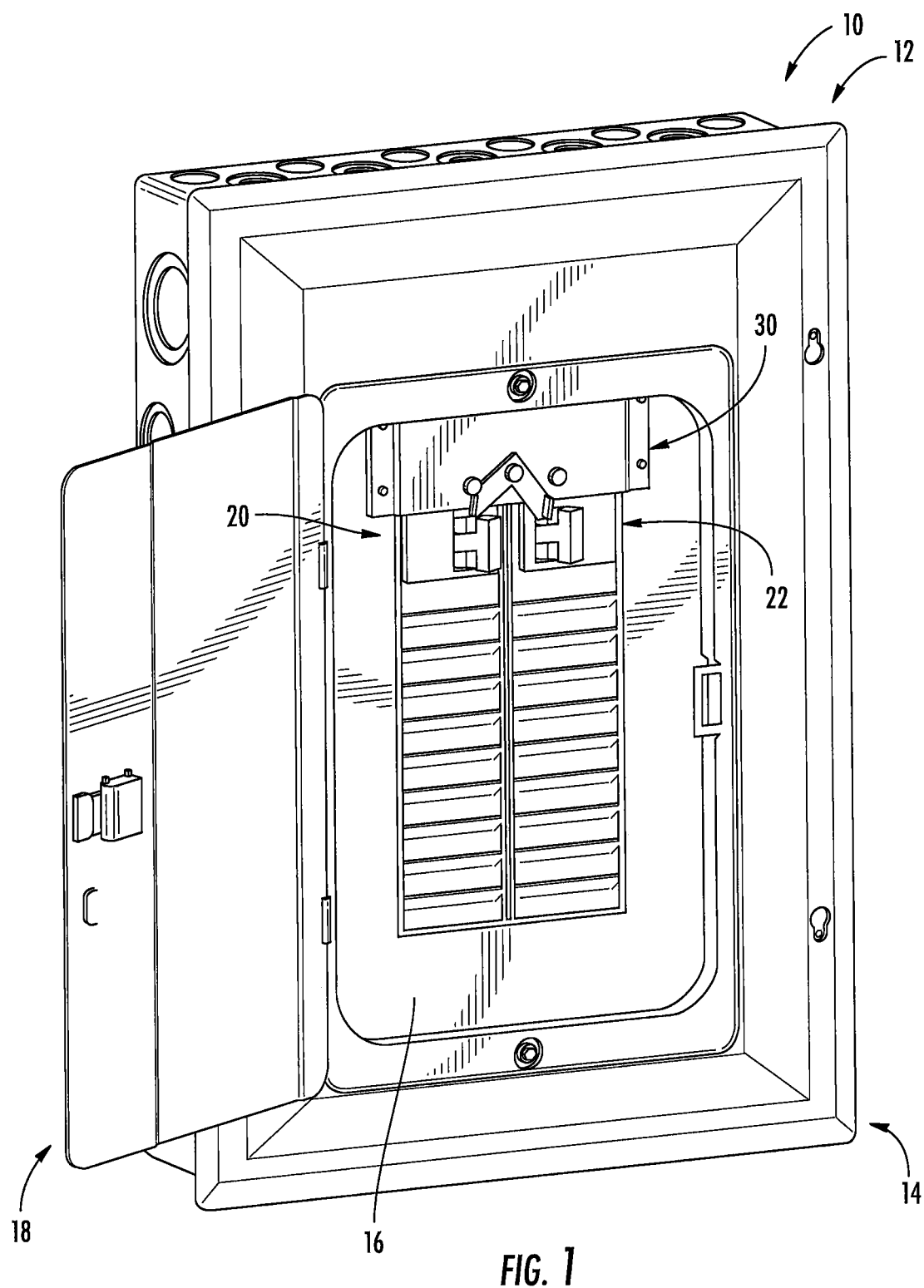
FIG. 1 is a perspective view of a panelboard system according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "includes," "comprising," and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the present invention are directed to an accessory or assembly used with panelboards that prevents a back-fed main circuit breaker from being in the "on" position at the same time as a secondary circuit breaker located on the opposite side of the bus assembly. The assembly may include a feature that pivots between obstructing the breaker handles so that only one source can be feeding the panelboard at a time.

A panelboard system 10 according to some embodiments is illustrated in FIG. 1. The system 10 includes a panelboard 12. The panelboard 12 includes an enclosure or housing 14. The panelboard 12 includes an inner cover or trim 16. The trim 16 may be coupled to the housing 14. A door 18 may be pivotally coupled to the housing 14.

The system 10 includes a first circuit breaker 20 and a second circuit breaker 22. As will be described in more detail below, each of the first and second circuit breakers 20, 22 includes a handle that is movable between an "on" position and an "off" position. In some embodiments, the first circuit breaker 20 is a primary or main circuit breaker and/or the second circuit breaker 22 is an alternate backfed circuit breaker. When the first circuit breaker 20 is in the on position, electrical supply to the panelboard 12 may be from a primary source such as the utility. When the second circuit breaker 22 is in the on position, electrical supply to the panelboard 12 may be from a secondary source such as a generator. The first and second circuit breakers 20, 22 are horizontally (laterally) spaced apart from one another.

Figure 2:
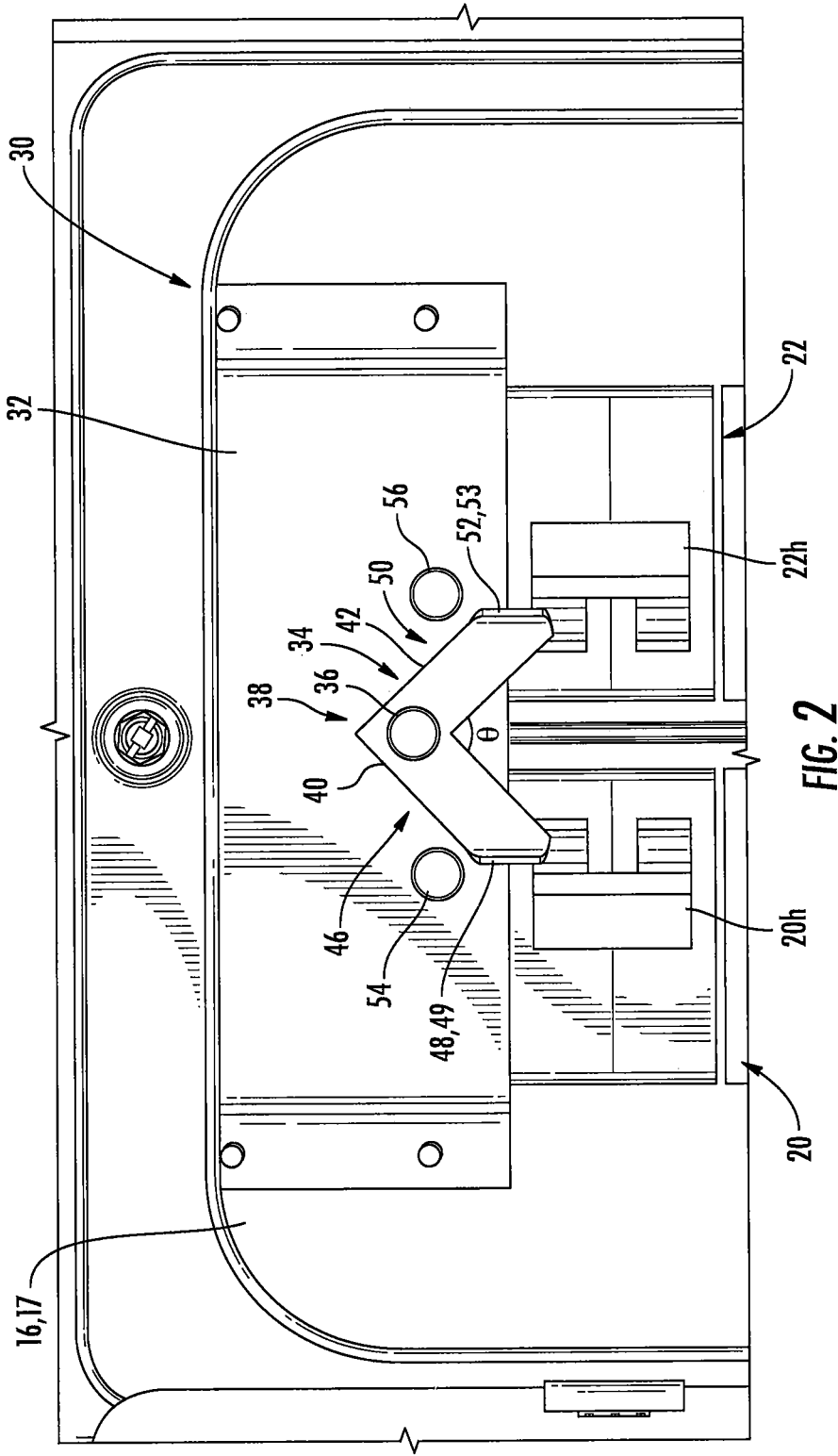
FIG. 2 is a fragmentary perspective view of an interlock assembly of the panelboard system of FIG. 1.

The system 10 includes an interlock assembly 30. With reference to FIGS. 1 and 2, the interlock assembly 30 includes an interlock panel or support 32. The panel 32 may be connected to a front side or surface 17 of the trim 16. A toggle bracket 34 is pivotally connected to the panel 32 at a pivot member 36. The pivot member 36 may be, for example, a fastener, a pin, a post, or a rivet head.

The toggle bracket 34 includes a body 38 that is pivotally connected to the panel 32. The toggle bracket 34 and/or the body 38 includes a first arm 40 that extends away from the pivot member 36 and a second, spaced apart arm 42 that extends away from the pivot member 36. For example, the first arm 40 may extend from the pivot member 36 toward the first circuit breaker 20 and the second arm 42 may extend from the pivot member 36 toward the second circuit breaker 22. The toggle bracket 34 may be L-shaped or substantially L-shaped. An angle between the first and second arms 40, 42 may be 90° or about 90°.

The first arm 40 may include a first portion 46 that extends from the pivot member 36 toward the first circuit breaker 20 and a second portion 48 that extends (forwardly) from the first portion 46. The first portion 46 and the second portion 48 may be perpendicular or substantially perpendicular to one another. The second portion 48 may define a first stop or stop member at a distal end 49 of the first arm 40. Similarly, the second arm 42 may include a first portion 50 that extends from the pivot member 36 toward the second circuit breaker 22 and a second portion 52 that extends (forwardly) from the first portion 50. The first portion 50 and the second portion 52 may be perpendicular or substantially perpendicular to one another. The second portion 52 may define a second stop or stop member at a distal end 53 of the second arm 42.

The interlock assembly 30 further includes a first protrusion 54 and a second protrusion 56 on opposite sides of the pivot member 36. Each of the first and second protrusions 54, 56 are on the panel 32 and protrude from a front side or surface of the panel 32. The first and second protrusions 54, 56 may each be a fastener, pin, post, or rivet head that is connected to the panel 32 and/or is integrally formed with the panel 32. The first protrusion 54 may be vertically aligned with and positioned above the first circuit breaker 20 and the second protrusion 56 may be vertically aligned with and positioned above the second circuit breaker 22.

FIG. 2 illustrates a first handle 20h of the first circuit breaker 20 in the off position and a second handle 22h of the second circuit breaker 22 in the off position. With each circuit breaker off, the toggle bracket 34 is in a relaxed or transition position. In some embodiments, with the toggle bracket 34 is in the relaxed or transition position, neither the first handle 20h nor the second handle 22h may be moved from the off position to the on position.

Figure 3:
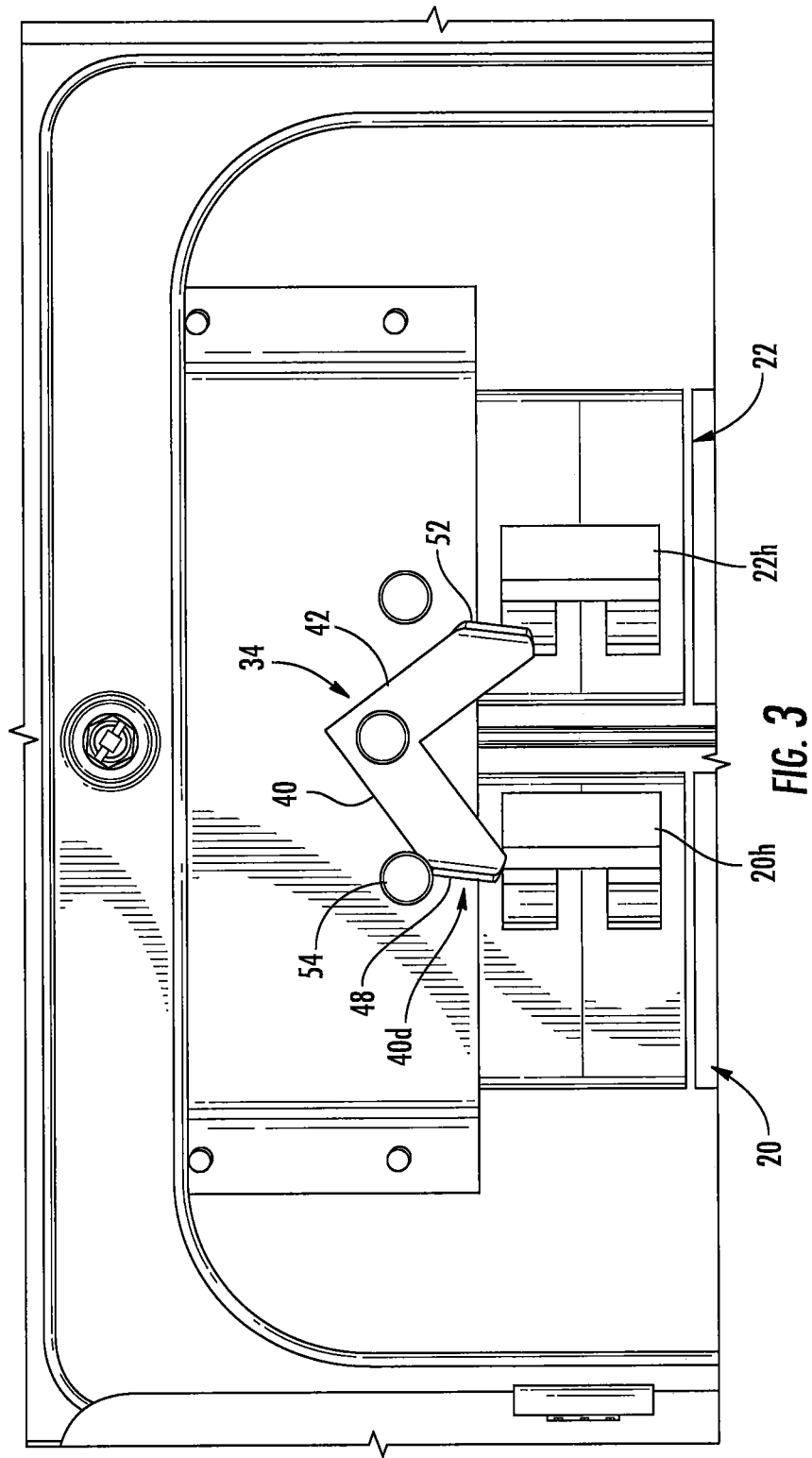
FIG. 3 is a fragmentary perspective view of the interlock assembly of FIG. 2 with a toggle bracket in a first position.

As illustrated in FIG. 3, the toggle bracket 34 may be rotated in a clockwise direction such that the first arm 40 is adjacent and/or abuts the first protrusion 54.

The first handle 20h may then be moved from the off position to the on position with the handle 20h moving or sliding underneath the first arm 40 of the toggle bracket 34. The toggle bracket 34 is then held in a first position as shown in FIG. 3. In the first position, a distal end portion 40d of the first arm 40 is held in place between the first handle 20h and the first protrusion 54. The first handle 20h and the first protrusion 54 may each engage the first arm 40 to hold (e.g., lock) the first arm 40 in place in the first position.

With the toggle bracket 34 in the first position, the handle 22h of the second circuit breaker 22 can only be moved a limited distance and is prevented from moving to the on position due to the presence of the second arm 42 including the second stop 52. It can be seen that the first protrusion 54 prevents further clockwise rotation of the toggle bracket 34.

The first handle 20h may be moved from the on position to the off position with the first handle 20h moving or sliding underneath the first arm 40 of the toggle bracket 34. The toggle bracket 34 may then assume the relaxed position shown in FIG. 2.

Figure 4:
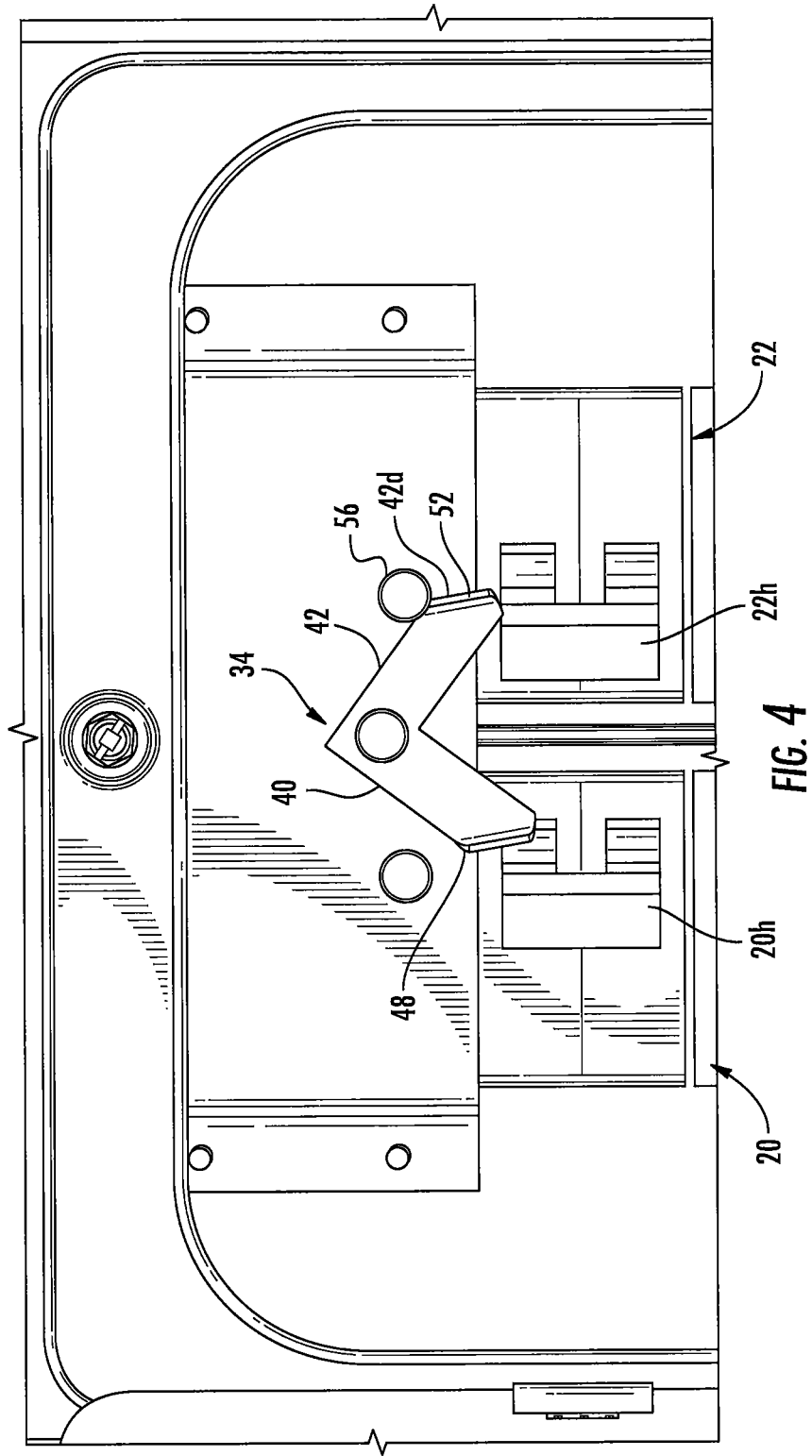
FIG. 4 is a fragmentary perspective view of the interlock assembly of FIG. 2 with a toggle bracket in a second position.

Referring now to FIGS. 2 and 4, the toggle bracket 34 may be rotated in a counterclockwise direction such that the second arm 42 is adjacent and/or abuts the second protrusion 56.

The second handle 22h may then be moved from the off position to the on position with the handle 22h moving or sliding underneath the second arm 42 of the toggle bracket 34. The toggle bracket 34 is then held in a second position as shown in FIG. 4. In the second position, a distal end portion 42d of the second arm 42 is held in place between the handle 22h and the second protrusion 56. The second handle 22h and the second protrusion 56 may each engage the second arm 42 to hold (e.g., lock) the second arm 42 in place in the second position.

With the toggle bracket 34 in the second position, the handle 20h of the first circuit breaker 20 can only be moved a limited distance and is prevented from moving to the on position due to the presence of the first arm 40 including the first stop 48. It can be seen that the second protrusion 56 prevents further counterclockwise rotation of the toggle bracket 34.

Unlike some known interlocks, such as some sliding interlocks, the present invention provides an interlock that does not have a continuous motion wherein one of the circuit breakers is turned on and the other one of the circuit breakers is turned off at the same time. Instead, the present invention pivots to provide an interlock that has a discontinuous motion and/or sequence that is believed to comply with certain codes such as UL 67 24A.1.

Figure 5:
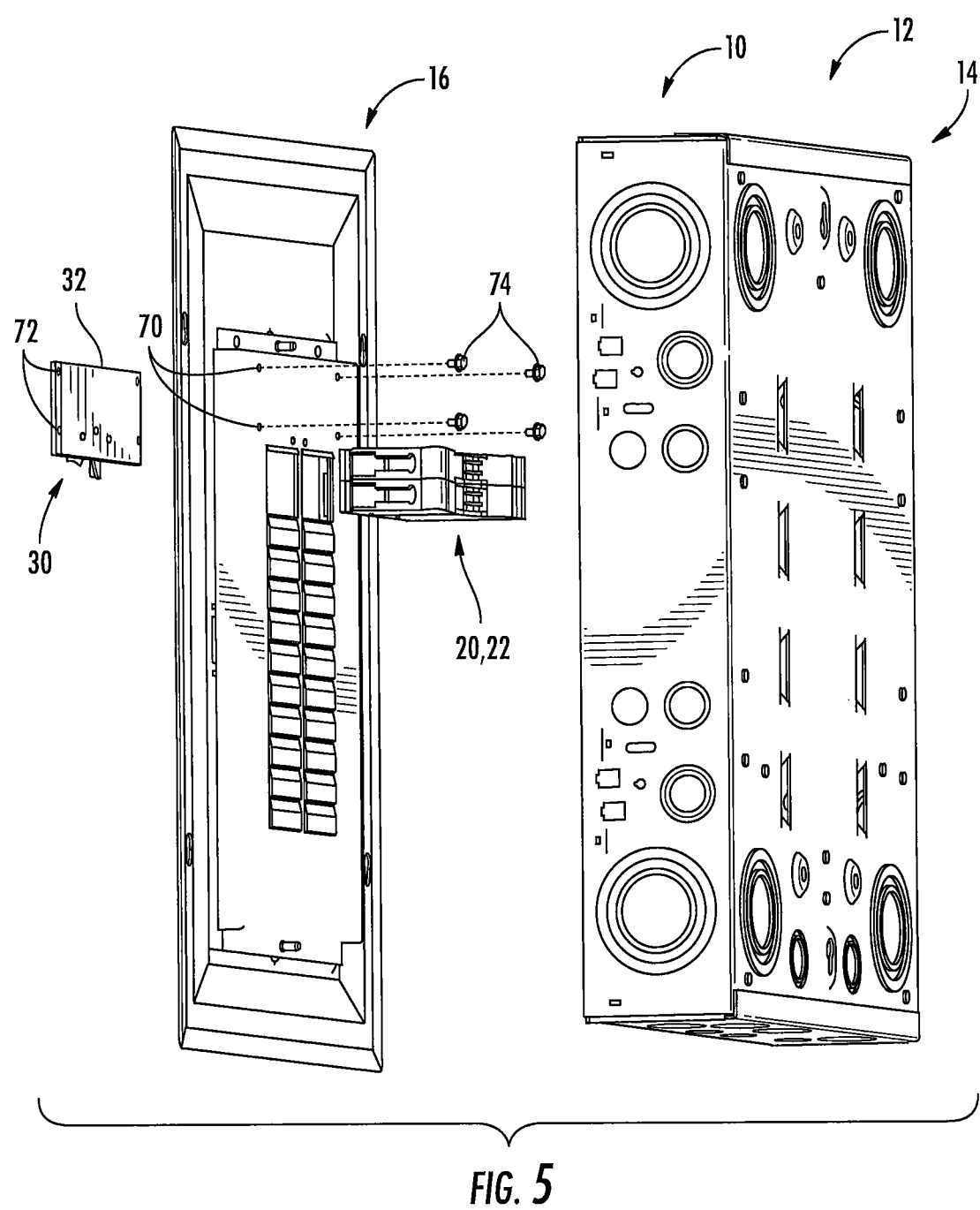
FIG. 5 is an exploded perspective view of the panelboard system of FIG. 1.

The interlock assembly 30 may be provided as part of a kit. A method for installing the interlock assembly 30 will now be described with reference to FIGS. 1, 2, and 5.

First, it should be verified that power at the panelboard 12 is off before beginning installation.

The trim 16 is removed from the enclosure 14 by removing fasteners such as screws attaching the trim 16 to the enclosure 14.

A plurality of holes 70 are drilled in the trim 16 corresponding to a plurality of holes 72 in the interlock support panel 32. The interlock assembly 30 is installed using fasteners 74 such as rivets or screws received through the holes 70 and 72.

The trim 16 is then reattached to the enclosure 14.

The installer may then confirm that the interlock assembly 30 prevents the first circuit breaker 20 (e.g., main breaker) and the second circuit breaker 22 (e.g., generator breaker) from being in the on position at the same time.

It will be appreciated that the interlock assembly 30 may also be factory installed in a panelboard.

As can be seen in FIGS. 1-5, the interlock assembly 30 provides a compact solution that is useful for mounting at or near the top of the trim 16.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

The invention claimed is:

1. A panelboard system comprising:
   a panelboard;
   a first circuit breaker in the panelboard, the first circuit breaker comprising a first handle that is movable between an on position and an off position;
   a second circuit breaker in the panelboard, the second circuit breaker comprising a second handle that is movable between an on position and an off position;
   an interlock assembly comprising:
      an interlock panel;
      a first protrusion on the interlock panel and positioned above the first circuit breaker;
      a second protrusion on the interlock panel and positioned above the second circuit breaker; and
      a toggle bracket pivotally connected to the interlock panel at a pivot member between the first and second protrusions, the toggle bracket comprising a first arm extending from the pivot member toward the first circuit breaker and a second arm extending from the pivot member toward the second circuit breaker;
   wherein, when the toggle bracket is rotated in a first direction such that the first arm is adjacent and/or abutting the first protrusion and the first handle is then moved from the off position to the on position, the toggle bracket is held in a first position with the second arm positioned to prevent the second handle from moving from the off position to the on position; and wherein, when the toggle bracket is rotated in a second direction, opposite the first direction, such that the second arm is adjacent and/or abutting the second protrusion and the second handle is then moved from the off position to the on position, the toggle bracket is held in a second position with the first arm positioned to prevent the first handle from moving from the off position to the on position.

2. The system of claim 1, wherein:
the first arm is held between the first protrusion and the first handle with the toggle bracket in the first position; and
the second arm is held between the second protrusion and the second handle with the toggle switch in the second position.

3. The system of claim 1 wherein the first and second circuit breakers are horizontally spaced apart from one another.

4. The system of claim 1 wherein:
the toggle bracket is in a relaxed position when each of the first handle and the second handle are in the off position;
the first arm is spaced apart from the first protrusion and the second arm is spaced apart from the second protrusion with the toggle bracket in the relaxed position; and
the toggle bracket prevents each of the first handle and the second handle from being moved from the off position to the on position with the toggle bracket in the relaxed position.

5. The system of claim 1 wherein the pivot member is positioned above and between the first circuit breaker and the second circuit breaker.

6. The system of claim 1 wherein the interlock panel is connected to a front side of a trim of the panelboard.

7. The system of claim 1 wherein:
the first arm comprises a first portion extending from the pivot member toward the first circuit breaker and a first stop that is substantially perpendicular to the first portion; and
the second arm comprises a first portion extending from the pivot member toward the second circuit breaker and a second stop that is substantially perpendicular to the first portion.

8. The system of claim 1 wherein the toggle bracket is substantially L-shaped.

9. An interlock assembly for use with a panelboard comprising a first circuit breaker having a first handle and a second circuit breaker having a second handle, the assembly comprising:
an interlock panel configured to be connected to the panelboard in an installed position;
a first protrusion on the interlock panel;
a second protrusion on the interlock panel; and
a toggle bracket pivotally connected to the interlock panel at a pivot member between the first and second protrusions, the toggle bracket comprising a first and second spaced apart arms each extending away from the pivot member;
wherein, with the interlock panel in the installed position:
when the toggle bracket is rotated in a first direction such that the first arm is adjacent and/or abutting the first protrusion and the first handle is then moved from an off position to an on position, the toggle bracket is held in a first position with the second arm positioned to prevent the second handle from moving from an off position to an on position; and when the toggle bracket is rotated in a second direction, opposite the first direction, such that the second arm is adjacent and/or abutting the second protrusion and the second handle is then moved from the off position to the on position, the toggle bracket is held in a second position with the first arm positioned to prevent the first handle from moving from the off position to the on position.

10. The assembly of claim 9, wherein:
the first arm is held between the first protrusion and the first handle with the toggle bracket in the first position; and
the second arm is held between the second protrusion and the second handle with the toggle switch in the second position.

11. The assembly of claim 9 wherein:
the toggle bracket is in a relaxed position when each of the first handle and the second handle are in the off position;
the first arm is spaced apart from the first protrusion and the second arm is spaced apart from the second protrusion with the toggle bracket in the relaxed position; and
the toggle bracket prevents each of the first handle and the second handle from being moved from the off position to the on position with the toggle bracket in the relaxed position.

12. The assembly of claim 9 wherein, with the interlock panel in the installed position, the first protrusion is positioned above the first circuit breaker and the second protrusion is positioned above the second circuit breaker.

13. The assembly of claim 9 wherein, with the interlock panel in the installed position, the first arm of the toggle bracket extends from the pivot member toward the first circuit breaker and the second arm of the toggle bracket extends from the pivot member toward the second circuit breaker.

14. The assembly of claim 9 wherein, with the interlock panel in the installed position, the pivot member is positioned above and between the first circuit breaker and the second circuit breaker.

15. The assembly of claim 9 wherein the interlock panel is configured to connect with a top portion of a trim assembly of the panelboard in the installed position.

16. The assembly of claim 9 wherein an angle defined between the first and second arms is 90°.

17. A method comprising:
providing a panelboard system comprising:
a panelboard;
a first circuit breaker in the panelboard, the first circuit breaker comprising a first handle that is movable between an on position and an off position;
a second circuit breaker in the panelboard, the second circuit breaker comprising a second handle that is movable between an on position and an off position;
an interlock assembly comprising:
an interlock panel;
a first protrusion on the interlock panel;
a second protrusion on the interlock panel; and
a toggle bracket pivotally connected to the interlock panel at a pivot member, the toggle bracket comprising a first arm extending from the pivot member toward the first circuit breaker and a second, spaced apart arm extending from the pivot member toward the second circuit breaker;

with the first handle and the second handle each in the off position, rotating the toggle bracket in a first direction such that the first arm is adjacent and/or abutting the first protrusion;

moving the first handle from the off position to the on position such that the first handle moves beneath the first arm of the toggle bracket;

in response to moving the first handle from the off position to the on position, holding the toggle bracket in a first position with the second arm positioned to prevent the second handle from moving from the off position to the on position;

with the first handle and the second handle each in the off position, rotating the toggle bracket in a second direction, opposite the first direction, such that the second arm is adjacent and/or abutting the second protrusion;

moving the second handle from the off position to the on position such that the second handle moves beneath the second arm of the toggle bracket; and in response to moving the second handle from the off position to the on position, holding the toggle bracket in a second position with the first arm positioned to prevent the first handle from moving from the off position to the on position.

18. The method of claim 17 wherein:

the first arm is held between the first protrusion and the first handle with the toggle bracket in the first position; and the second arm is held between the second protrusion and the second handle with the toggle switch in the second position.

\* \* \* \* \*